Aug. 31, 1965  J. S. HUTCHISON  3,204,217
SYSTEM FOR TRANSFERRING DATA FROM WELL LOGS
Filed June 7, 1960  4 Sheets-Sheet 1

John S. Hutchison  Inventor
By John D. Gassett  Attorney

John S. Hutchison  Inventor

By John D. Gassett  Attorney

Aug. 31, 1965  J. S. HUTCHISON  3,204,217
SYSTEM FOR TRANSFERRING DATA FROM WELL LOGS
Filed June 7, 1960  4 Sheets-Sheet 3

John S. Hutchison  Inventor

By John D. Gassett  Attorney

Aug. 31, 1965  J. S. HUTCHISON  3,204,217
SYSTEM FOR TRANSFERRING DATA FROM WELL LOGS
Filed June 7, 1960  4 Sheets-Sheet 4

John S. Hutchison  Inventor
By John D. Dassett  Attorney

United States Patent Office 3,204,217
Patented Aug. 31, 1965

3,204,217
SYSTEM FOR TRANSFERRING DATA FROM WELL LOGS
John S. Hutchison, Tulsa, Okla., assignor, by mesne assignments, to Esso Production Research Company, Houston, Tex., a corporation of Delaware
Filed June 7, 1960, Ser. No. 34,450
6 Claims. (Cl. 340—15.5)

This invention very broadly concerns a system for obtaining information from a visual presentation of indications of subsurface strata, formations and their various characteristics. It is especially intended for use in conjunction with the system of processing data obtained from well logs on a high-speed digital computer.

In the search for oil and other petroleum fluids, boreholes are drilled in the earth's surface to great depths. To determine some of the characteristics and types of the various formations or strata encountered, various well logs are normally run. The term "well log" as used herein shall mean a record with respect to depth of parameters of subsurface formation or strata which have been penetrated by a borehole and may include electric logs, driller logs, gamma ray logs or any of numerous other types or combinations thereof. By studying these various logs, one skilled in the art can determine with a rather high degree of accuracy, valuable subsurface knowledge such as information concerning which zones or substrata formation may contain oil or gas. An indication of permeability, porosity, etc., of the various formations can also be determined. By studying a group or series of logs for a number of wells in the same geographical area, the shape and size as well as other characteristics of subsurface structure may be determined.

In making a geological study of a given area, one skilled in the art of interpreting well logs normally studies individual well logs separately and compiles the tabulation of the various parameters desired. The interest is normally to preserve various parameters such as lithology, porosity, permeability, etc. A tabulation of such information interpreted from the log is prepared manually and then put into various forms for further use and stored. If desired, the information may be hand punched on punch cards for further use in automatic computing machines. While this method is valuable in obtaining the information and preserving it, it is normally the practice to limit the amount of information thus obtained in order to lessen the tremendous task of recording and preserving such information. It is therefore one object of the present invention to provide an improved simplified system for accelerating and facilitating the processing of information from well logs. Other objects will be explicitly described or will be readily apparent from the following description.

In a broad aspect, this is a system used to transfer data from well logs to punch cards or the like for further use on automatic computers or to other means of storing or recording such transcribed information. The lithologies, intervals or other parameters, shown by the response of the curves or other visual indication of the well log being studied are interpreted by one skilled in the art. The desired parameters are than manually indicated on a transparent or translucent overlay. This overlay comprises a multichannel transparent recording medium in which channels are arranged side-by-side and with the length of the channels made proportional to the scale of the well log. A specific form of overlay will be described hereinafter in conjunction with the drawing. However, it can be said that it is preferably a separate sheet of transparent or translucent paper which has a plurality of vertical columns with a separate vertical column for each desired parameter. The vertical scale of the column is preferably the same as the scale of the well log. The occurrences of selected parameter indicated on the recorded medium in the proper vertical column at intervals spaced vertically corresponding to the depth occurrence of the indication of the parameter on the log under study.

The invention may be better understood by reference to the attached drawing and the following description in which.

Figure 1:
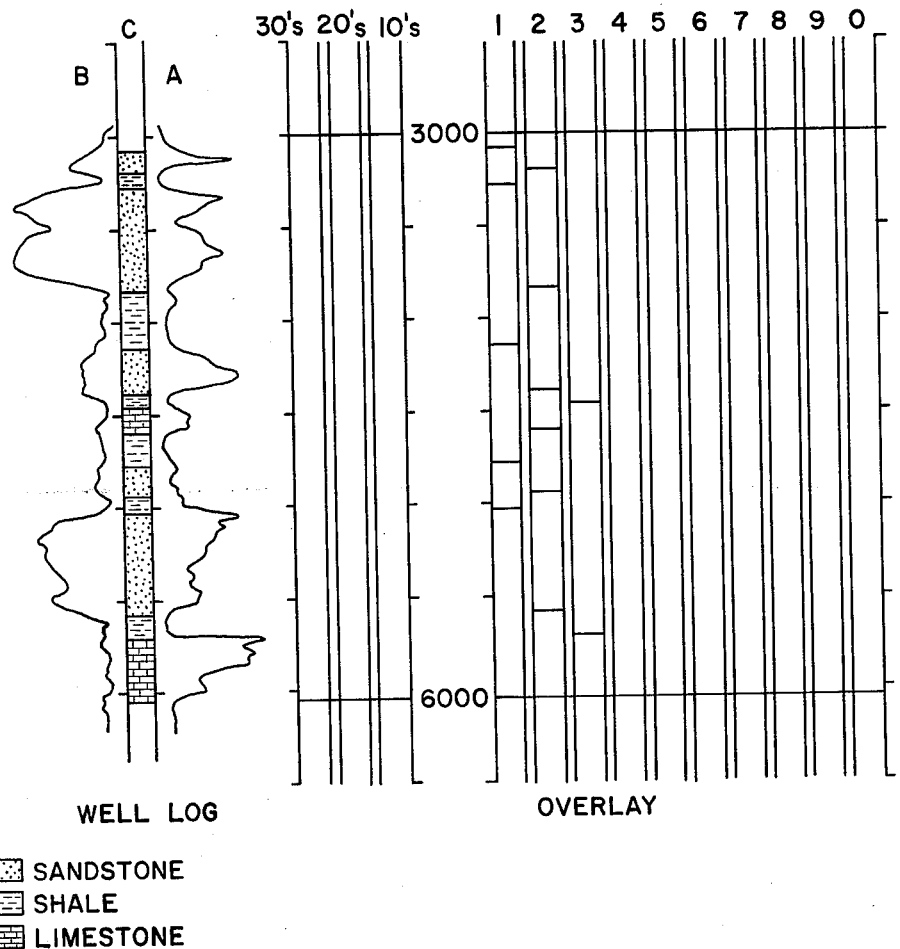
FIG. 1 illustrates a typical electric well log and an overlay prepared therefrom.

Referring to the drawing of FIG. 1 in particular, there is shown thereon a typical well log and an overlay. The well leg is a typical electric well log and is illustrated on the right curve A which is a resistivity log and on the left curve B which is a self potential log. Resistivity logs and self potential logs are well known to those skilled in the art. By studying curves A and B, one skilled in the art can determine with considerable accuracy the nature and the characteristics of the underground strata encountered. For example, in an interval from 3,000 feet to 6,000 feet which this segment of the log represents, there are three different types of strata encountered; namely, sandstone, shale and limestone. Column C represents the position and thickness of the various strata within the interval. Column C has been set forth here merely as an aid in the explanation of this system and is not normally placed on well logs.

On the right hand side of FIG. 1 there is an overlay suitable for use in this invention. The overlay illustrated is a recording medium which may conveniently take a base form of a plurality of vertical columns placed upon translucent or transparent paper. In other words, the overlay is on a separate sheet of paper from the log itself in a preferred form. On the overlay shown, there are 13 columns—ten for the units, one for the tens, one column for the twenties and one for the thirties, as illustrated. As illustrated, column 1 is reserved for sandstone, column 2 for shale and column 3 for limestone. The remaining columns may be used to represent the recording of other parameters taken from the well log illustrated or other logs which may be available to represent porosity, oil stained intervals, etc. The combination of the 10 "units" columns and the 3 "tens" columns offer a maximum of 40 parameters that can be recorded. This is usually sufficient for most well log information that is desired to be saved. It is to be noted that on the overlay shown, only the tops of the lithology is listed as the bottom of one type strata encountered corresponds to the top of the next succeeding type strata. The tops of the various zones encountered in the interval shown are under study or "picked" or interpreted by one skilled in the art and the horizontal marks are placed on the base form of the overlay manually in the proper column at the proper position. This procedure is continued until the entire interval under consideration has been interpreted and transcribed to the recording base form.

Figure 2:
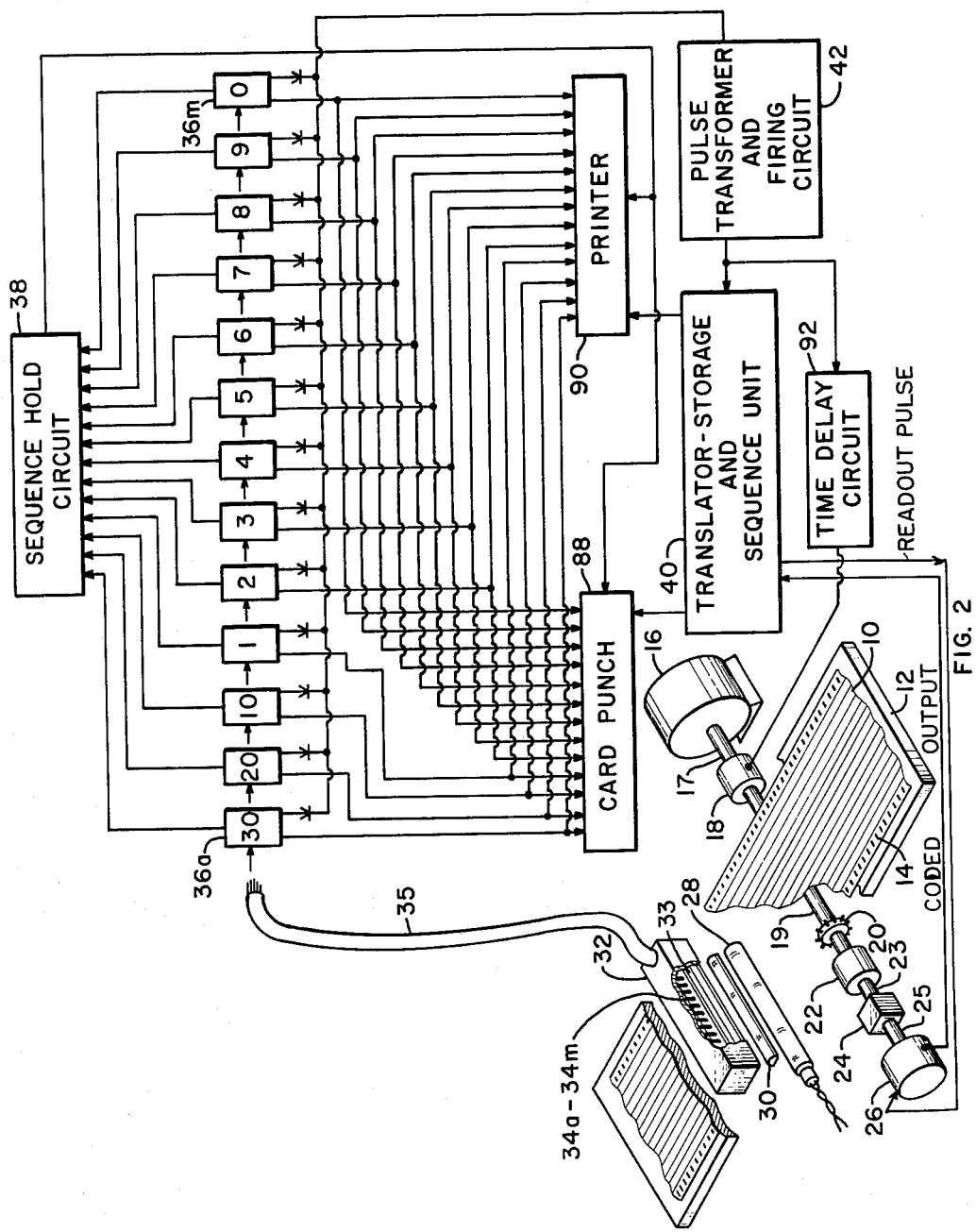
FIG. 2 illustrates a preferred embodiment of the invention as well as the best mode contemplated for carrying out the invention.

Referring especially to FIG. 2 in which the best mode contemplated for carrying out the invention is illustrated, it will be seen that the overlay chart is herein designated numeral 10 and is mounted on a preferably horizontal support 12. Overlay chart 10 has a row of perforations 14 on either side thereof. Also illustrated are motor 16 connected by shaft 17 to electric clutch and brake 18. A shaft 19 extends from clutch 18 and has mounted thereon sprocket gears 20. Sprocket gears 20 are so arranged as to drive overlay 10 through engagement with perforations 14. Shaft 23 connects clutch 22 with gear reducer 24. Shaft 25 connects gear reducer 24 with shaft encoder 26.

Placed underneath overlay chart 10 and support 12 is light source 28. Between light source 28 and overlay 10 is focusing means such as focusing lens 30 which is of a character to concentrate the light into a narrow line which is perpendicular to the columns on overlay 10. Support 12 is provided with means such as a slit or transparent section to permit the passage of the line of light. Positioned above overlay 10 and in line with lens 30 is a bank 32 of photocells such as photocell Type 800 N–P–N Phototransistor commercially available from Texas Instruments Inc., Dallas, Texas. Narrow slit 33 is placed in the bottom of the housing for photocells bank 32. Slit 33 is aligned with the line of light passing through lens 30. In the photocells bank 32 there is one photocell placed above each column of overlay 10. Each photocell 34a to 34m is aligned such that it receives light coming from its respective column it represents on overlay 10. When a mark passes under the photocell cell, the current in the photocell drops. In other words, the photocell is sensitive to and indicates when a mark has been reached or is under that photocell.

The output from photocell 34a through 34m is fed through multiple connector cable 35 to transistor trigger circuits 36a to 36m, respectively. Then it is seen that there is a transistor trigger circuit representative of each column on overlay 10. The columns are indicated in the rectangular diagram 36a through 36m which represents transistor trigger circuits. For example, in the block representing trigger circuit 36a there is shown the number 30. This indicates the left-hand column in the overlay of FIG. 1. The other blocks are appropriately marked.

Figure 4:
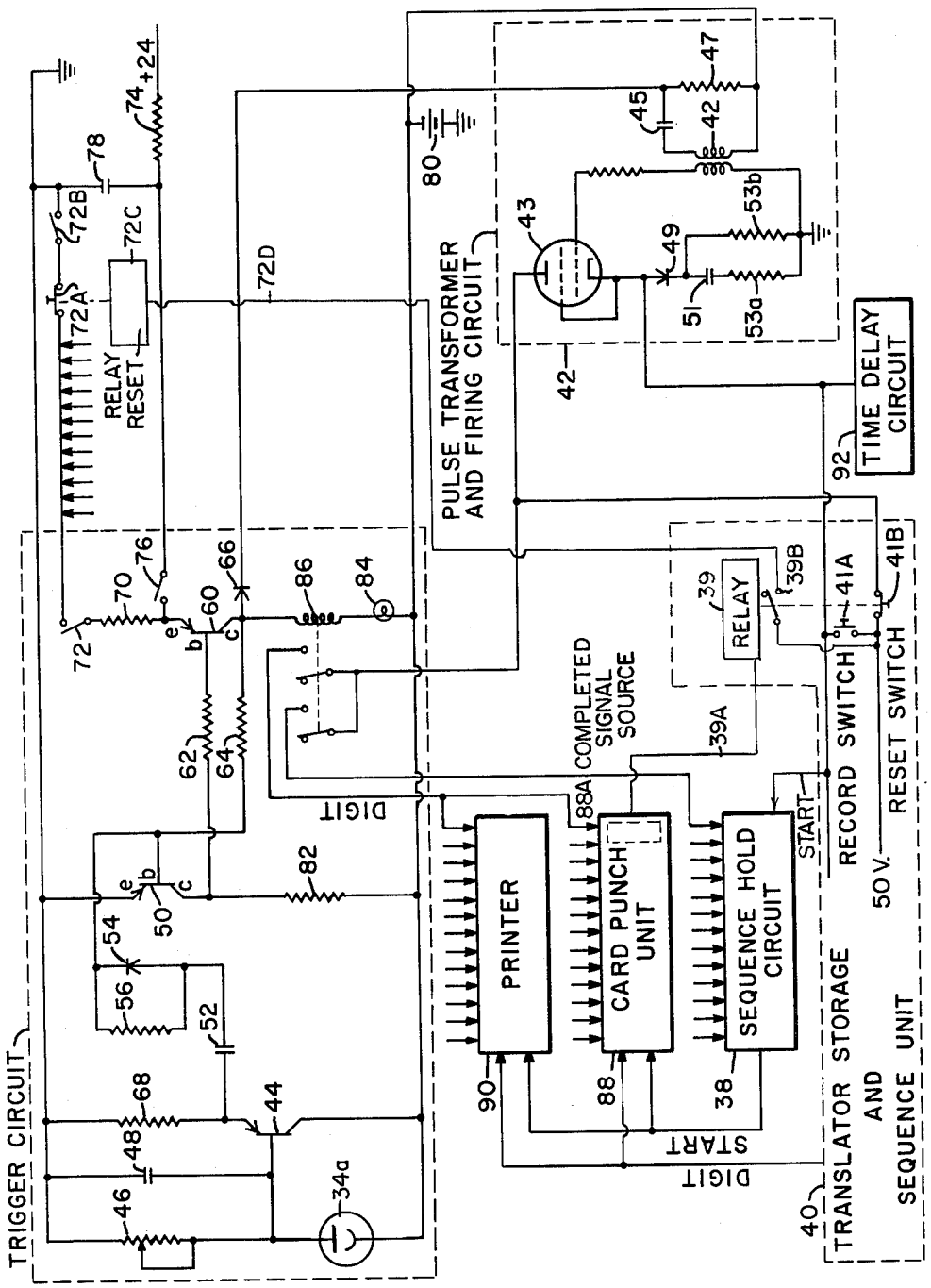
FIG. 4 illustrates a typical trigger circuit of the embodiment.

As will be seen more in detail when FIG. 4 is discussed, each transistor trigger circuit 36a through 36m has three outlets. One outlet from each trigger goes to a sequence hold circuit 38 which will be discussed in greater detail in relation to FIG. 5. A second outlet from each transistor trigger circuit 36a through 36m is electrically connected to card punch 88 and printer 90. A third outlet from each of trigger circuits 36a to 36m are fed to a common line which is connected to pulse transformer 42.

The detail of the trigger circuits 36a through 36m will be shown more completely in connection with FIG. 4. However, in general, it can be said that each trigger circuit is of a character to be set off upon its associated photocell 34a to 34m having a reduced current therethrough. In the operation of this device, the reduced current through the photocell would be caused by a mark in the column (below the photocell) passing between the light source and the photocell.

Turning now to FIG. 4, there is illustrated thereon a typical channel of the trigger circuits 36a through 36m. Also shown on FIG. 4 is block diagram of sequence and hold circuit 38, time delay unit 92 and certain of the component parts of the translator-storage unit. In discussing the typical trigger circuit channel, it is seen to include a photocell 34a which, in general, can be said is a high impedance component and is therefore a constant current device while receiving a constant intensity of light. However, when the light to the photocell is interrupted as when a mark on the overlay paper blocks the light beam, the current through the photocell suddenly reduces which sets off the trigger circuit. A transistor 44 is supplied to the circuit and its base current is supplied by photocell 34a and controlled by a sensitivity control means 46. Sensitivity control unit 46 is an adjustable type resistor which is used to shunt a portion of the current that would otherwise go to the base of transistor 44. In other words, the sensitivity control is used to adjust the current to the base of transistor 44 as may be desired. A capacitor is placed parallel to sensitivity control 46. By this arrangement of capacitor 48, high frequency noises are shunted to the ground without appreciable loss to the trigger response.

A sudden reduction in base current to transistor 44 produces a low impedance positive pulse at its emitter. This pulse is transmitted to the base of transistor 50 through capacitor 52 and diode 54. A shunt resistor 56 is provided for diode 54. A second transistor 60 is also supplied in the trigger circuit. Transistors 50 and 60 are connected as bistable binaries. Transistor 50 is normally on while transistor 60 is normally off. The base of transistor 50 is connected through resistor 64 to the collector of transistor 60.

The emitter side of transistor 44 is connected through resistor 68 to ground. The emitter side of transistor 50 is likewise connected to the ground and the emitter of transistor 60 is connected through resistor 70 to ground. The ground side of switch 72 is connected to a common line with the ground sides of similar switches in the other trigger circuits. Relay switch 72A and manual reset switch 72B are in a common line connecting the ground sides of switch 72 and the similar switches to ground. Relay switch 72A is conveniently momentarily opened at the end of each readout cycle by the coil energy received from the completion signal of the card punch unit at the end of every readout. A suitable card punch unit is commercially available from International Business Machines Corporation, 590 Madison Avenue, New York 22, N.Y., and is designated 523 Gang Summary Punch. The completion signal, obtained from source labeled block 88A within card punch unit 88, is fed through line 39A to a relay 39 within translator storage and sequence unit 40; a suitable such storage and sequence unit is described hereinafter. Upon receiving the completion signal, relay 39 closes switch 39B whose terminal base is connected to a 50-volt source. The closing of switch 39B actuates relay reset 72C to open switch 72A. The opening of switch 72A resets all the trigger units 36a to 36m; i.e., in the trigger circuit illustrated transistor 50 is rendered conductive and transistor 60 is cut off.

A positive voltage supply is connected through resistor 74 and normally open manual trigger-switch 76 to the emitter of transistor 60. A capacitor 78 is in a circuit between the ground and a point between resistor 74 and switch 76.

A negative voltage from source 80 is connected to the collector side of transistor 44 and photocell 34a. Negative voltage, preferably above twelve volts, from source 80 is also connected through resistor 82 to the collector side of transistor 50. The negative voltage from source 80 is further connected to the collector of transistor 60 through lamp 84 which serves as a visual monitor of relay means 86. Relay means 86 has double pole double throw contacts or stated differently, twin two-position switches. One of the closures of relay means 86 is connected to sequence and hold circuit 38 and the other closure is connected to card punch 88 and printer 90. The term "closure" as used herein means the completion of an electrical circuit through contacts, or relay contacts. The bank of arrows leading to the line between switches 72 and 72A represents electrical connections from the other twelve trigger circuits indicated in FIG. 2. Likewise, the bank of arrows to printer 90, the bank of arrows to sequence hold circuit 38 and the bank of arrows to card punch unit 88 represents electrical leads from the other twelve trigger circuits illustrated in FIG. 2. The output side of diode 66 is connected through capacitor 45 to transformer 42. Resistor 47 provides a discharge path for capacitor 45. The high side of transformer 42 is electrically connected to the grid of tetrode 43 which is preferably a thyratron. As will be seen hereinafter, a sequenced positive voltage is fed to the plate of thyratron 43. The cathode of thyratron 43 is grounded through diode 49 and an RC filter including capacitor 51, resistors 53a and 53b. The cathode of tetrode 43 is connected to time delay circuit 92 and to translator-storage and sequence unit 40. A suitable translator-storage and sequence unit is commercially available from G. M. Giannini and Company, Inc., Datex Division, Monrovia, California, and is designated as their 14300 Series Digital Data-Systems. That commercially available unit has a record switch 41A, reset switch 41B and a positive voltage source indicated in FIG. 4. The positive voltage is shown to be 50 volts. In that unit, reset switch 41B is automatically opened at the completion of the punch and print readout. Switch 41B is ganged to switch 39B as shown so that when relay 39 operates to close one of the switches, it simultaneously opens the other switch. Thyratron 43 is connected into the sequence unit 40 so as to perform electronically the same function as is normally done by the record switch 41A of a standard translator-storage and sequence unit. It is seen that when a positive pulse is transformed by pulse transformer 42, it raises the grid of thyratron 43 so as to cause the thyratron to fire. When this happens, its cathode potential becomes very nearly that of the plate which is about 50 volts and this is equivalent to closing record switch 41A to the 50 volt supply. The plate of thyratron 43 receives 50 volts from the sequence by the automatic opening of reset switch 41B unit which is automatically, momentarily interrupted at the end of any readout sequence. This simply resets the circuit for the next trigger pulse by extinguishing thyratron 43 and again making it sensitive to the next trigger pulse to arrive.

For the particular embodiment shown in FIG. 2, there are 13 trigger circuits similar to that illustrated in FIG. 4. The output from each such trigger circuit is fed to both card punch 88 and printer 90. The function of the sequence-hold circuit is to provide relay contact closures for the card punch unit and print unit start circuits when a predetermined correct combination of marks are read by the photo-transistors. Translator-storage and sequence unit 40 is of a character to read the position of shaft encoder 26, upon receiving a power pulse from pulse transformer and firing circuit 42, and transmit the information received from shaft encoder 26 to punch unit 88 and printout unit 90. That is, provided the relay contact closures of the sequence and hold circuit 38 do not interrupt the start circuits of punch unit 88 and printout unit 90.

Referring back to FIG. 2, a power pulse from pulse transformer and firing circuit 42 is fed to time delay circuit 92. Time delay circuit 92 is of a character that after it receives a 50 volt pulse from the cathode of thyratron 43, it continues energy to clutch 18 a preselected time, then de-energizes unit 18 to disengage the clutch and to stop the movement of overlay 10. This delay is to permit the mark on the overlay to pass from under the photocells 34a to 34m. The time delay relay circuit is illustrated in detail in FIG. 3. It may be described in general terms as a dual-time-delay relay for dropout and pullin. The pulse from thyratron 43 is fed into the circuit at junction 94. The current from junction 94 is fed to diode 96 and to diode 98, in an upper and lower branch of the circuit, respectively. The supply diodes 96 and 98 prevent feedback from the discharging capacitors into the sequence circuits. The upper branch includes resistor 100 and capacitor 102. The lower branch includes adjustable resistor 104, resistor 106 and capacitor 108. A shunt resistor 110 is provided around resistors 104, 106 and capacitor 108. Junction 112 in the upper branch between resistor 100 and capacitor 102 is connected to junction 114 in the lower branch between resistor 104 and 106 by line containing diodes 116 and 118. Diodes 116 and 118 are arranged such that they will permit flow of current only toward junction 120 therebetween. The junction 120 is connected to relay 122 which switches power to brake and drive clutch element 18.

The 50 volt power supply supplied to junction 94 is off until the system is triggered. When the voltage comes on, the lower branch of the circuit supplies current through resistor 110 to relay coil 122.

The sprocket drive mechanism 20 is arranged to transport the paper overlay at a rate of about one inch per second for convenient operations. When a mark passes under a photocell and triggers off the system, for proper operations it is desired that an adjustable time delay begin and sustain the drive means for about 50 milliseconds. After this delay, the drive clutch means 18 is opened. The 50 milliseconds delay is necessary to drive the paper far enough before stopping to insure that the mark is not in the path of the light beam. It has been found that the overshoot or the travel during the delay time must be held to a minimum to avoid passing up any close interval marks. Therefore, an adjustable time delay feature has been incorporated therein to adjust for any records having close interval marks thereon. It has been found that a range of 5 to 300 milliseconds delay is usually sufficient. It has been found desirable to have a time at the end of the delay during which the drive clutch is not energized. It has also been found desirable to have a 200 milliseconds delay at the end of the sequence before the drive clutch is re-energized. This permits all relays time to drop out and reset before another overlay mark retriggers the system. In other words, the delay unit of FIG. 3 has two time intervals after it is triggered. The first time interval continues the energization of the clutch for a selected period after the system is triggered by an overlay mark to permit the mark to clear the light beam. The second time interval or delay occurs immediately after the translator-storage and sequence unit 40 has cleared and is a selected period of time during which the clutch mechanism continues to not be energized. At the end of this second period, the clutch mechanism is again energized to drive the paper overlay 10 forward.

Figure 3:
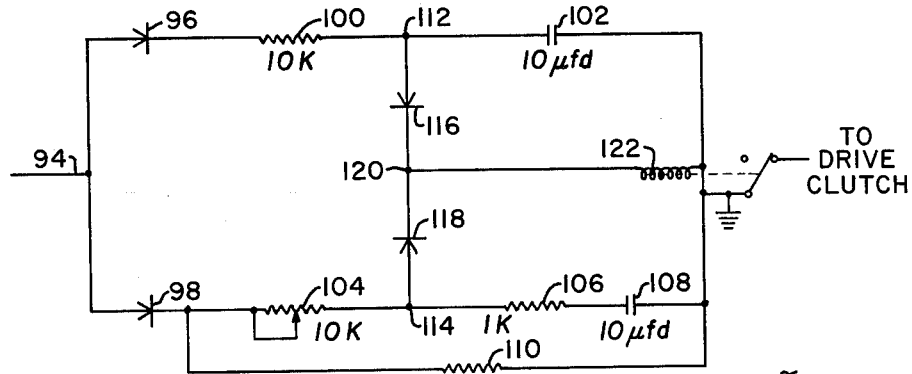
FIG. 3 illustrates a time delay relay circuit used in the embodiment of FIG. 2.

The circuit for these time delay functions is shown in FIG. 3. In general, it is a dual-time-delay for a pullin and dropout. A 50 volt supply fed to junction 94 is off until the system is triggered. When the voltage comes on, the lower branch of the circuit supplies current to the relay coil 122 through resistor 104. During this time capacitor 102 and 108 are both charging but 108 in the lower branch is charging faster because it has a shorter time constant. Resistor 106 in series with the capacitor 108 provides additional voltage drop. This pullin delay is preferably set at about 50 milliseconds. At the end of translator-storage unit 40 sequence cycle, the 50 volt voltage supply is removed when thyratron 43 is extinguished which occurs on the opening of reset switch 41B in translator-storage and sequence unit 40. The upper branch then supplies current to relay 122 until the current is no longer sufficient to maintain relay 122 in an open position. It has been found desirable to have this period to be about 200 milliseconds. In the meantime, the lower branch capacitor 108 is discharging to variable resistor 104 and resistor 106. This low resistance path is used to insure complete discharge before the next sequence of operation. If it were not completely discharged, the next pullin time delay would be shortened. Supply diodes 96 and 98 are used to prevent feedback from the discharging capacitors into the sequence circuits of unit 40. Desired delays are obtained by proper selection of the size of the capacitors and resistors. For example, delays of 50 milliseconds and 200 milliseconds are obtained from components having values as indicated in FIG. 3 and using a Potter Brumfield relay PW5LS with 10K coil resistance.

Certain trigger errors can be prevented from being printed or incorporated in the card punch or other display or storage recording system. This can be accomplished by automatically holding up the sequence operations when an incorrect trigger combination is picked up. In the practice of this invention, parameter information is employed on the overlay so that there is at least one, but only one, digit occurring in the unit columns on the overlay and one or no information occurring in the tens column. In other words, a sequence-hold circuit is needed to carry out this check such that if more than one digit occurs in the units columns, for example, the operation of the system is stopped. Likewise, if two or more digits occur in the tens column, the system is likewise stopped.

Figure 5:
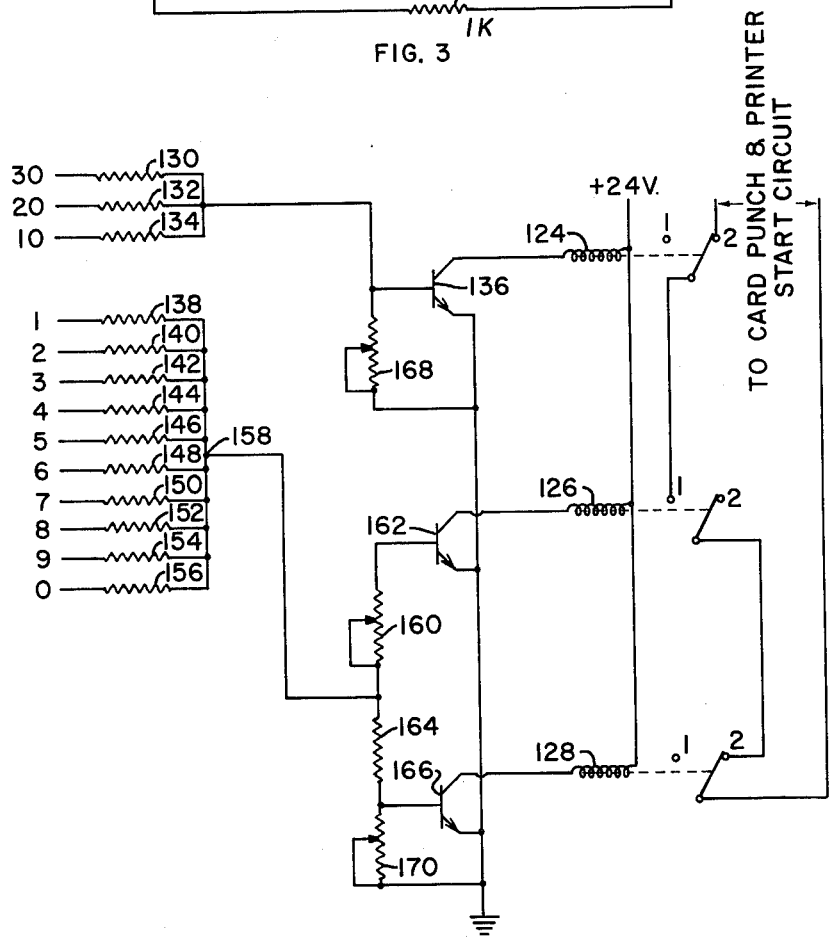
FIG. 5 illustrates a sequence hold circuit.

To understand the sequence-hold system, attention is now directed especially to FIG. 5. Illustrated in FIG. 5 are relays 124, 126 and 128. When no current is flowing in the coils of relays 124, 126 and 128 switching means are each in position 2. It is thus seen that if relay 126 is energized and relays 124 and 128 are not energized, the connection to the sequence unit will be grounded for normal operations. In the operation of the complete system it is desired that if two or more tens parameter triggers are initiated at one time the unit can be rendered non-operative. This is conveniently accomplished by having relay 126 energized to have its switch in the number 1 position for one or more units parameter triggers and relay 128 be energized to move its switch to position 1 for two or more units parameter triggers. When the switch for relay 128 is in position 1 the print units have their start circuits interrupted and the process is stopped.

Referring to FIG. 5 in particular, the currents from the tens parameter relay contact closures (such as relay 86 shown in FIG. 4) are added through mixing resistors 130, 132 and 134 and fed to the base of transistor 136. The currents from parameter relay contact closures representing the units are fed through resistors 138, 140, 142, 144, 146, 148, 150, 152, 154 and 156 and are added at junction 158. Junction 158 is connected to adjustable resistor 160 to the base of transistor 162 and through resistor 164 to the base of transistor 166. A base to ground variable resistor 168 is provided for transistor 136. Likewise, a base to ground variable resistor 170 is provided for transistor 166. Adjustable resistor 168 is adjusted such that current from two or more closures to resistors 130, 132, or 134 will energize relay 124 and open the associated switch contacts of relay 124. Variable resistors 160 and 170 are adjusted such that current from one or more parameter closures from the units will pull or place the switch of relay 126 in the position 1. However, when only one mark in the units column has been encountered, resistor 170 is adjusted such that insufficient current will pass through the coil of relay 128 to pull the switch into position 1. However, when two or more units parameter closures are made, relay 128 then operates to pull the switch into the number 1 position thus opening the ground for the sequence system and stopping the readout operation.

It is understood that the cables from the translator-storage and sequence unit 40 down to the card punch 88 and printer 90 are symbolic of multiple cables which are connected to the individual solenoids as required to produce the digits required for a particular readout. The sequence hold circuit 38 provides closures for the card punch unit and printout unit start circuits. If the closures in the sequence hold circuit are not provided, the start operation is held up in the readout units until such time as the sequence hold circuits are properly arranged to provide the closures. The machine may either be cleared or the correct order of trigger circuits achieved either manually or automatically.

Although the operation of the system is believed obvious from the previous description of the components, it is believed that a brief description of the operation will be helpful. Overlay 10 is first prepared in a manner described hereinbefore in relation to FIG. 1. The overlay 10 is then placed on support 12. The indexing of encoder 26 and the indexing of overlay 10 are then adjusted as necessary to assure correct reading. Each manual trigger switch 76 is open for each of the trigger circuits 36a through 36m. Power is supplied to the various components in a known manner including power supply to motor 16. The magnetic clutch is placed in operative position and the equipment is then in operation with the overlay 10 being transported along support 12 by rotation of sprockets 20. When a mark in a channel of overlay 10 interrupts the light beam from the light source to a photocell, the corresponding photo-transistor current drops. This transient is fed to its respective trigger circuit which is thereby tripped. This results in the parameter closure of relay 86 for the purpose of closure in the printer and card punch unit to indicate the channel from which the signal was received. Pilot light 84 is alighted indicating the column in which the mark was detected. At the same time a positive pulse is sent from the trigger circuit activated to pulse transformer 42. The stepped-up pulse from pulse transformer 42 goes on to trigger thyratron 43 for initiating the translator-storage unit 40. From the translator-storage unit 40 a low impedance, or readout pulse goes out to shaft encoder 26. The coded output of the encoder 26 is sent to the thyratron relay matrix in the storage unit 40. Here the shaft position is decoded and stored with the relay contacts within the translator-storage unit providing the closures for subsequent punch-out and printout on card punch means 88 and printout means 90 in a manner well known to those skilled in the art.

Simultaneously with the low impedance pulse going to the shaft encoder a 50 volt translator-storage unit power pulse goes through thyratron 43 to the time delay circuit 92 which controls the motor clutch 18. After about 50 milliseconds, the clutch opens and stops the movement of the overlay 10. The clutch stays inoperative during the remainder of the readout and for an additional preselected time for which 200 milliseconds has been found to be suitable. The time delay is provided by the circuit shown particularly in FIG. 3 as was explained above. During the 200 milliseconds delay all relays are restored to their original positions by the opening of relay switch 72A at the end of the readout thereby clearing the previously triggered channel or channels. The trigger units are then ready for any new incoming marked signals. When the next trigger mark is encountered on the overlay, the process will be repeated.

If during the operation of this procedure, two or more unit digits are indicated from photo-transistors 34d to 34m or if two or more tens units are indicated from photo-transistors 34a, b, or c, then the sequence hold circuit as illustrated in FIG. 5 will open either relay 124 or 128 thus stopping the operation. The operator at this time may operate the main trigger reset switch 72B thereby clearing all trigger channels while the storage unit continues to hold the depth information. The operator then manually triggers into the system by means of switch 76 the correct parameter information that is desired to go with the particular depth being held. An alternative is to clear a particular trigger channel which is known to be erroneously active by momentarily operating its switch 72. The sequence unit then goes through its normal readout. It is also important to note that should the translator-storage sequence unit 40 be triggered by some extraneous noise with none of the parameters being triggered, the sequence hold circuit will likewise stop the readout equipment as the switch of relay 126 will be in position 2.

It will be understood that the apparatus and system contained in the above description are merely representative or illustrative and not limited and that numerous modifications may be made therein without departing from the scope of the invention.

What is claimed is:

1. A sequence hold circuit for use with a first group and a second group of parameter information with each group having a plurality of parameters which comprises in combination: a first transistor; a second transistor and a third transistor, each said transistor having a collector, a base and an emitter; means electrically connecting the first group of parameter information to the base of said first transistor; a base ground resistor for said first transistor; a first relay having a normally closed switch, the coil of said first relay being connected to the collector of said first transistor; electrical means connecting the second group of parameter information to the base of said second transistor; a variable resistor in an electric connection between said second group and the base of said second transistor; a second relay having a normally open switch, the coil of said second relay being connected to the collector of said second transistor; electrical means connecting a voltage from said second group of parameter information when triggered to the base of said third transistor; a second variable resistor in an electrical connection from the base of said third transistor to ground; a third relay having a normally closed switch, the coil of said third relay being electrically connected to the collector of said third transistor.

2. A time delay relay circuit which comprises in combination: an upper branch and a lower branch in parallel with each branch being connectable to a common voltage source; said upper branch comprising a first diode, a first resistor, and a first capacitor all connected in series; said second branch including a second diode, a first adjustable resistor, a second resistor, and a second capacitor all connected in series; a shunt circuit about said first adjustable resistor, said second resistor and said second capacitor, said shunt circuit including a third resistor; an electrical connecting means connecting said first branch between said first resistor and said first capacitor and said second branch between said first variable resistor and said second resistor; third and fourth diodes in said electrical connecting means; and a relay connected to the connecting circuit between said diodes.

3. An apparatus for extracting information from a translucent overlay having individual columns for different parameters and light interrupting marks placed laterally across the columns at positions indicating the top of certain parameters as interpreted from a well log, said apparatus comprising: a support means adapted to receive said overlay; driving means to move said overlay along said support means; a line light source of a character to direct a line beam of light through said overlay perpendicular to the columns thereon; a photoelectric detector for each column on said overlay, such detectors arranged in a row perpendicular to and adjacent the columns of said overlay, said detectors being of a character to have one magnitude current flowing therethrough when struck by said beam of light and a second distinguishable magnitude of current flowing therethrough when said light source is blocked by said marks; delay means for momentarily stopping the movement of said overlay a fixed period of time after a light interrupting mark has been detected by a photoelectric detector; and recording means adapted to record the relative position of each said interrupting mark upon its detection and the parameter such mark represents.

4. An apparatus for extracting information from a translucent overlay having individual columns for different parameters and light interrupting marks placed laterally in the columns at positions indicating the top of a parameter assigned to that column as interpreted from a well log, said apparatus comprising: a support means adapted to receive said overlay; a motor; a shaft driven by said motor; a clutch means mounted on said shaft; means connected to said clutch means to drive said overlay along said support; an encoder coupled to said shaft; a line light source adapted to direct a line beam of light through said overlay perpendicular to the columns thereon; photoelectric detectors arranged in a row perpendicular to and adjacent the columns on said overlay and arranged to receive light from said light source passing through said overlay, there being a detector for each column on said overlay, said detectors being of a character to have one magnitude of current flowing therethrough when struck by said beam of light and a second distinguishable magnitude of current flowing therethrough when said light source is blocked by said marks; recording means adapted to record the annular position of said encoder when the current flowing in said transistor is of a second magnitude indicating that a mark on said overlay has been encountered; and delay means for momentarily disengaging said clutch for a fixed duration after a light interrupting mark has been detected by photoelectric transistor and re-engaging said clutch a fixed period of time after said recording means has operated.

5. An apparatus for extracting information from a translucent overlay having a first group and a second group of individual columns for different parameters with light interrupting marks placed laterally across in the columns at positions indicating the top of the parameter asigned to that column as interpreted from a well log, said apparatus comprising: a support means adapted to receive said overlay; a motor; a shaft driven by said motor; a clutch and brake means mounted on said shaft and adapted to drive said overlay along said support and upon command to stop said overlay; an encoder coupled to said shaft; a line light source adapted to direct a line beam of light through said overlay perpendicular to the columns thereon; a first group of photoelectric detectors associated with the first group of individual columns and a second group of photoelectric detectors associated with the second group of individual columns, there being a photoelectric detector for each column on said overlay and such detectors arranged in a row perpendicular to the columns on said overlay and further arranged to receive light from said light source passing through said overlay, said detector being of a character to have one magnitude of current flowing therethrough when struck by said beam of light and a second distinguishable magnitude of current flowing therethrough when said light source is blocked by said mark; recording means adapted to record the annular position of said encoder when the current flowing in said detector is of a second magnitude indicating that a mark on said overlay has been encountered; a plurality of trigger circuits with each trigger circuit being associated with its respective photoelectric detector and being of a character to be set off upon its associated photoelectric detector having a second magnitude of current therethrough, there being a first group of trigger circuits associated with the first group of photoelectric detectors and a second group associated with the second group of photoelectric detectors; a sequence hold circuit means including a first transistor, a second transistor and a third transistor, each said transistor having a collector, a base and an emitter; first electrical circuit means connecting the first group of trigger circuits to the base of said first transistor; a base ground resistor for said first transistor; a first relay having a normally closed switch means, the coil of said first relay being connected to the collector of said first transistor; second electrical circuit means connecting the second group of trigger circuits to the base of said second transistor; a first variable resistor electrically connected between said second group of trigger circuits and the base of said second transistor; a second relay having a normally open switch, the coil of said second relay being connected to the collector of said second transistor; third electrical circuit means connecting said second group of trigger circuits to the base of said third transistor; a second variable resistor electrically connected from the base of said third transistor to ground; a third relay having a normally closed switch, the coil of said third relay being electrically connected to the collector of said third transistor; recording means electrically connected to the output of each said trigger circuit and to said encoder such that upon receiving a pulse from one of said trigger circuits said recording means records information indicative of the relative position of the encoder and the column on the overlay which caused the trigger circuit to fire; fourth electrical circuit means connecting the switches of said first relay, said second relay, and said third relay in series to said recording means such that when either said first or said third relay is operatively energized said recording means does not record; a pulse transformer and firing circuit electrically connected to output of each of said trigger circuits and of a character to generate an output pulse upon actuation by the output signal from one of said trigger circuits; means to reset said pulse transformer and firing circuit upon the recording of information; a time delay relay circuit including an upper branch and a lower branch in parallel with each branch being connectable to a common output of said pulse transformer and firing circuit; said upper branch comprising a first diode, a third resistor, and a first capacitor all in series; said second branch including a second diode, a fourth adjustable resistor, a fifth resistor, and a second capacitor all in series; a sixth resistor in a shunt circuit about said fourth adjustable resistor, said fifth resistor and said second capacitor; fifth electrical circuit means connecting said first branch between said third resistor and said first capacitor and said second branch between said fourth variable resistor and said fifth resistor; third and fourth diodes in said fifth electrical circuit means; a fourth relay having a switching means and the coil of said fourth relay being connected to the fourth electrical circuit means between said third and fourth diodes; and sixth electrical circuit means connected to said clutch and brake means through the switching means of said fourth relay.

6. An apparatus for extracting information from a translucent overlay having individual columns for different parameters and light interrupting marks placed laterally across the columns at positions indicating the top of certain parameters as interpreted from a well log, said apparatus comprising:

a support means adapted to receive said overlay;
driving means to move said overlay along said support means;
a line light source of a character to direct a line beam of light through said overlay perpendicular to the columns thereon;
a photoelectric detector for each column on said overlay, such detectors arranged in a row perpendicular and adjacent the columns of said overlay, said detector being of a character having one magnitude current flowing therethrough when struck by said beam of light, and a second distinguishable magnitude of current flowing therethrough when said light source is blocked by said mark;
delay means for momentarily stopping the movement of said overlay a fixed period of time after a light interrupting mark has been detected by a photoelectric detector;
recording means adapted to record the relative position of said interrupting mark upon its detection and the parameter such marks represent;
a trigger circuit connected to each said photoelectric detector; and
means connected to the trigger circuits and of a character to render the recording means inoperative in the event any interrupting marks are simultaneously detected in two columns in a selected group of columns.

References Cited by the Examiner

UNITED STATES PATENTS

| Re. 24,330 | 6/57 | Hawkins | 340—15.5 X |
| 2,578,133 | 12/51 | Hawkins | 346—33 |
| 2,638,402 | 5/53 | Lee | 346—33 |
| 2,753,494 | 7/56 | McLellan | 317—141 |
| 2,892,133 | 6/59 | Huge | 317—141 |
| 2,906,926 | 9/59 | Bauer | 317—148.5 |
| 2,935,661 | 5/60 | Quick | 317—148.5 |
| 2,990,535 | 6/31 | Parkinson et al. | 340—15.5 |

SAMUEL FEINBERG, *Primary Examiner.*
CHESTER L. JUSTUS, IRVIN L. SRAGOW,
*Examiners.*